Aug. 2, 1927.  1,637,613
C. E. JOHNSON
MOLD
Original Filed Nov. 4, 1925   2 Sheets-Sheet 1

INVENTOR:
CARL E. JOHNSON

By Ford H. Harris
ATTORNEY.

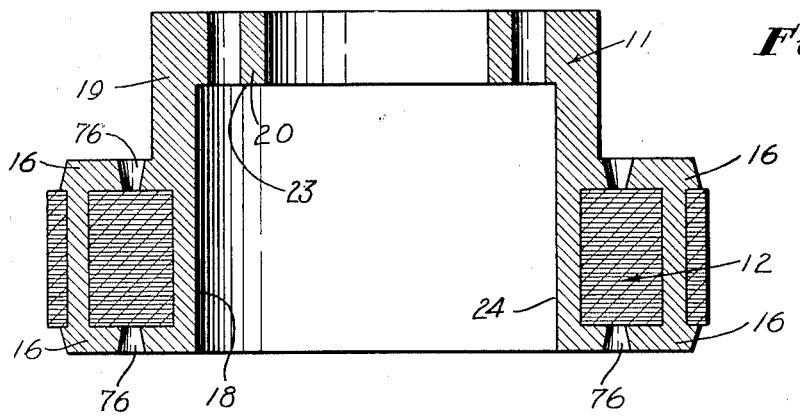
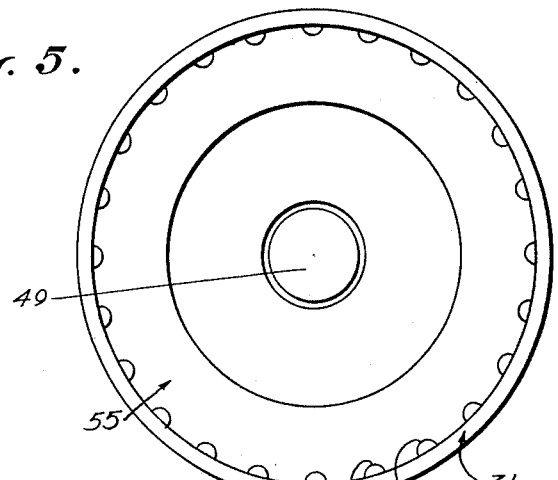
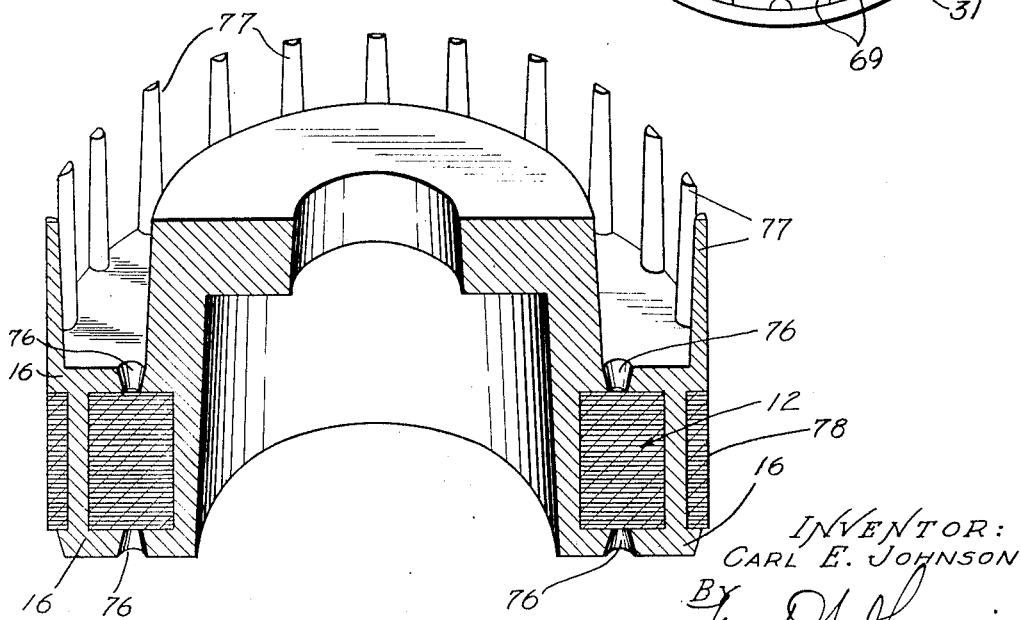

Patented Aug. 2, 1927.

1,637,613

UNITED STATES PATENT OFFICE.

CARL E. JOHNSON, OF LOS ANGELES, CALIFORNIA, ASSIGNOR TO UNITED STATES ELECTRICAL MANUFACTURING COMPANY, OF LOS ANGELES, CALIFORNIA, A CORPORATION OF CALIFORNIA.

MOLD.

Original application filed November 4, 1925, Serial No. 66,879. Divided and this application filed September 15, 1926. Serial No. 135,672.

This invention relates to molds and particularly to a mold for casting rotors of induction motors.

This application is a division of my application entitled Flanged rotor, Serial No. 66,879, filed November 4, 1925.

In the application referred to, I disclose a novel form of a rotor in which the squirrel-cage windings thereof are cast in such a manner as to provide a drive member for the rotor in which the laminations are embedded.

It is the general object of this invention to provide a mold for casting the squirrel-cage of the rotor of the character mentioned above.

Another object of the invention is to provide a mold of this character, in which the laminations are clamped rigidly together when the metal is being poured.

It is a further object of the invention to provide a mold of this character in which the parts may be readily separated after the rotor has been cast and so that the rotor may be readily removed from the mold.

Other objects and salient advantages of the invention will be made evident hereinafter.

Referring to the drawings in which I illustrate my invention,

Fig. 5 is a plan view of Fig. 3 taken as indicated by the arrow 5 of Fig. 3.

Fig. 6 is a sectional perspective view showing the rotor of my invention immediately after it has been removed from the mold and previous to the machining thereof.

Fig. 7 is a vertical section through the rotor of my invention after it has been machined.

Figure 1:
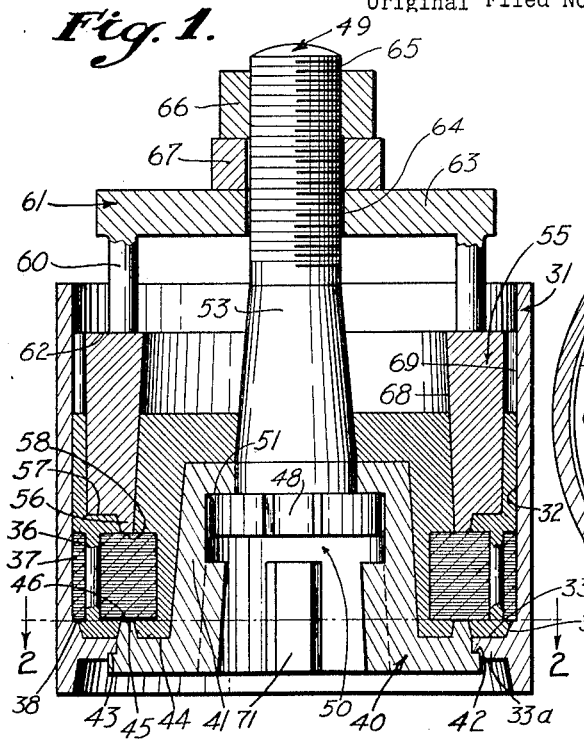
Fig. 1 is a vertical cross-section taken through a mold embodying the features of the invention.

Before describing the details of the mold of the invention I will briefly describe the rotor which is produced thereby.

Referring to Fig. 7, the rotor comprises a member 11 and a magnetic body 12 which is embedded in and supported by the drive member 11. The magnetic body 12 is composed of ring-shaped laminations which are placed together as shown. The drive member comprises conductor bars which extend parallel to the axis of the rotor and in circular arrangement therearound, rings 16 which are arranged at the opposite ends of the magnetic body 12, a cylindrical wall 18 which extends inside the magnetic body 12, a cylindrical extension 19 which extends upward from the upper end ring 16 of the cylindrical wall 18, and an annular flange 20 which extends inward from the upper part of the cylindrical extension 19. The drive member 11 is machined so as to provide accurate faces, namely, the annular shoulder 23 and a cylindrical face 24 provided by the cylindrical wall 18.

Figure 2:
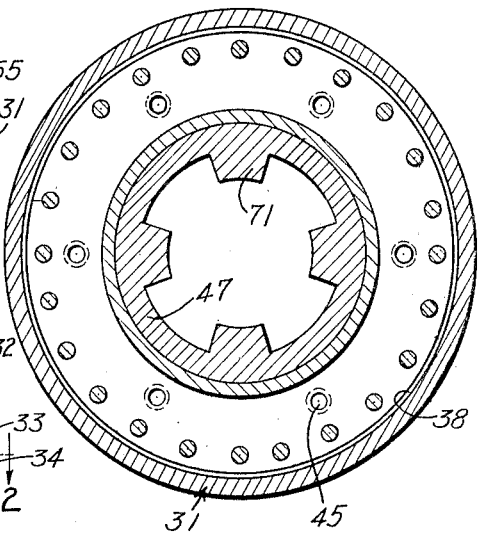
Fig. 2 is a horizontal cross-section taken on the line 2—2 of Fig. 1.

Referring to Figs. 1 to 5 inclusive, the mold of this invention has a body 31 having an inner cylindrical wall 32, a lower annular face 33 provided by an annular flange 33ª extending inward from the cylindrical wall 32 of the body 31, and an annular bevel face 34 situated between the cylindrical wall 32 and the annular face 33, all of which cooperate to provide a lamination chamber 36. The laminations 37 which form the magnetic body 12 are placed in the chamber 36 so that the lower lamination engages a shoulder 38 of the body 31. This shoulder 38 is annular and quite narrow, being formed between the cylindrical wall 32 and the bevel face 34. A core 40 has a cup portion 41 which extends within the annular laminations 37. The outer face of the cup portion 41 is tapered so as to provide clearance in order that the parts may be pulled. An annular shoulder 42 formed in the lower end of the core 40 engages a ring face 43 formed by the annular flange 33ª. Formed on a face 44 of the core 40, which face rests in the same plane as the annular face 33 of the body 31, is a plurality of core clamp buttons 45 which are circularly arranged as shown in Fig. 2. Upper faces 46 of these clamp buttons 45 rest in the same plane as the annular shoulder 38 and are adapted to contact the lower lamination 37.

A head 48 of the mandrel 49 rests in a cavity 50 of the core 40 and engages a face 51 formed at the upper part of the cup portion 41. A stem portion 53 of the mandrel 49 extends upward to the exterior of the body 31. A cap 55 is placed in the lamination chamber 36 above the laminations 37. Cap clamp buttons 56 extend from a lower face 57 of the cap 55, these cap buttons 56 having faces 58 which contact an upper lamination 37. Legs 60 of a yoke 61 engage an upper face 62 of the cap 55. A cross bar portion 63 of the yoke 61 has an opening 64 through which an upper threaded end 65 of the mandrel 49 extends. A nut 66 is threaded on the upper end 65 of the mandrel 49 which forces a washer 67 against the bar portion 63 of the yoke 61. When the nut 66 is clamped in place, the core 40 is pulled upward and the cap 55 is forced downward in such a manner that the core clamp buttons 45 and the cap clamp buttons 56 clamp the laminations 37 tightly. The core 40 cannot be pulled upward beyond a certain position by reason of the engagement of the faces 42 and 43.

Figure 3:
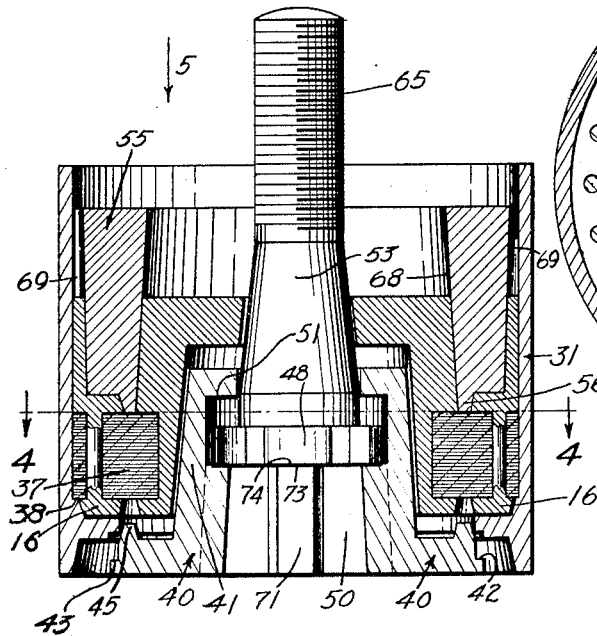
Fig. 3 is a vertical section similar to Fig. 1, but showing the manner in which the parts of the mold may be separated.
Figure 4:
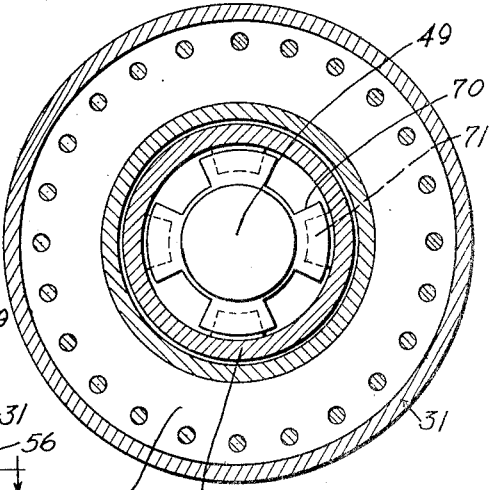
Fig. 4 is a section taken on the line 4—4 of Fig. 3.

Metal is poured into the mold through a central opening 68 of the cap 55, this metal flowing in all the spaces of the mold as shown clearly in Figs. 1 and 3. The opening 68 is tapered so that the cap 55 may be pulled. Risers 69 in the form of semi-cylindrical channels are provided in the cap 55 for the escape of gases in order to eliminate blow-holes in the casting.

After the drive member of the rotor has been properly cast it is removed from the mold. With reference to Fig. 3, as the nut 66, the washer 67 and the yoke 61 have been removed from the mold, the mandrel 49 is partially rotated so that the slots 70 (Fig. 4) formed in the head 48, disalign with lugs 71 formed in the lower part of the cavity 50 of the cup 41, these slots and lugs being aligned when the mandrel is inserted in place. A lower face 73 of the head 48 engages upper faces 74 of the lugs 71. The mandrel 49 is then forced downward and the core 40 is thereby removed from place. The manner in which the core 40 is removed is clearly shown in Fig 3. After the core and mandrel have been removed from the body 31, the rotor and cap are readily removed from place.

In Fig. 6, I show the rotor after it has been removed from the mold and before it has been machined. It should be noted that the end rings 16 have a series of openings 76 which are made by the clamp buttons 45 and 56, and riser bars 77 extend upward from the upper end ring 16, owing to the fact that metal flows into the riser openings 69 when it is poured into the mold. The rough rotor is placed in a lathe or other suitable machine so that the periphery 78 of the magnetic body 12 is concentric with the axis of rotation. The various faces of the rotor are then all machined to correct size and so that they are true. It is obvious that all of the faces may be made true, all of the cylindrical faces being absolutely concentric with the periphery 78 of the magnetic body 12. The rotor, after it has been machined, has the appearance as shown in Fig. 7.

From the foregoing description it will be seen that the mold of my invention provides a very strong rotor. Rigidity is had because of the fact that all of the laminations 37 are securely clamped together while the metal is being poured. A very important feature of the invention, as previously pointed out, is the fact that the parts of the mold may be readily dismantled so that the rotor may be easily removed from the mold after the drive member 11 has been cast.

I claim as my invention:

1. A mold comprising: a body adapted to receive laminations; a core adapted to extend inside said laminations, having means for engaging a lower lamination; a cap adapted for insertion into said body, having means for engaging an upper lamination; and means for clamping said cap and said core in a manner to compress said laminations.

2. A mold comprising: a body having a lamination chamber adapted to receive laminations; a core having a cup portion adapted to extend inside said laminations; core buttons formed on said core, being positioned to engage a lower lamination; a cap adapted to be inserted into the portion of said lamination chamber above said laminations; cap buttons formed on said cap, being adapted to engage an upper lamination; and means for clamping said core and said cap together, said core and cap buttons clamping said laminations.

3. A mold comprising: a body having a lamination chamber adapted to receive laminations; a core having a cup portion adapted to extend inside said laminations; core buttons formed on said core, being positioned to engage a lower lamination; a cap adapted to be inserted into the portion of said lamination chamber above said laminations; cap buttons formed on said cap, being adapted to engage an upper lamination; means for clamping said core and said cap together, said core and cap buttons clamping said laminations; and means for removing said core from place.

4. A mold comprising: a body having a lamination chamber adapted to receive laminations; a core having a cup portion adapted to extend inside said laminations; core buttons formed on said core, being positioned to engage a lower lamination; a cap adapted to be inserted into the portion of said lamination chamber above said laminations; cap buttons formed on said cap, being adapted to engage an upper lamination; a mandrel extending through said core, having a head resting in said cup; a yoke engaging said cap, through which said mandrel extends; and means for causing said mandrel and said core to clamp said core and said cap together, said core and cap buttons clamping said laminations.

5. A mold comprising: a body having a lamination chamber adapted to receive laminations; a core having a cup portion adapted to extend inside said laminations; core buttons formed on said core, being positioned to engage a lower lamination; a cap adapted to be inserted into the portion of said lamination chamber above said laminations; cap buttons formed on said cap, being adapted to engage an upper lamination; a mandrel extending through said core, having a head resting in said cup; a yoke engaging said cap, through which said mandrel extends; means for causing said mandrel and said core to clamp said core and said cap together, said core and cap buttons clamping said laminations; and means for removing said core from place.

6. A mold comprising: a body having a lamination chamber adapted to receive laminations; a core having a cup portion adapted to extend inside said laminations; core buttons formed on said core, being positioned to engage a lower lamination; a cap adapted to be inserted into the portion of said lamination chamber above said laminations; cap buttons formed on said cap, being adapted to engage an upper lamination; a mandrel extending through said core, having a head resting in said cup; a yoke engaging said cap, through which said mandrel extends; means for causing said mandrel and said core to clamp said core and said cap together, said core and cap buttons clamping said laminations; and lugs formed in said cup of said core, there being slots in said head of said mandrel to allow said head to pass thereby, said mandrel being rotatable in order to provide engagement between said head and said lug so that said core may be removed by a movement of said mandrel.

7. A mold comprising: a body adapted to receive laminations; a core adapted to extend inside said laminations, having means for engaging a lower lamination; a cap adapted for insertion into said body, having means for engaging an upper lamination; and means for clamping said cap and said core in a manner to compress said laminations, said clamping means being operable after said cap is inserted in said body.

8. A mold comprising: a body adapted to receive laminations; a core adapted to extend inside said laminations, having means for engaging a lower lamination; a cap adapted for insertion into said body, having means for engaging an upper lamination; and means for clamping said cap and said core in a manner to compress said laminations, said cap and said code being spaced a distance from said laminations.

9. A mold comprising: a body adapted to receive laminations; a core having a cup portion adapted to extend inside said laminations, having means for engaging a lower lamination; a cap adapted for insertion into said body, having means for engaging an upper lamination; means for clamping said cap and said core in a manner to compress said laminations; and means in said cup portion for removing said core from place.

10. A mold comprising: a body adapted to receive laminations; a core adapted to extend inside said laminations, having means for engaging a lower lamination, said core cooperating with said body to form a cavity for receiving the material poured; a cap adapted for insertion into said body, having means for engaging an upper lamination; and means for clamping said cap and said core in a manner to compress said laminations.

In testimony whereof, I have hereunto set my hand at Los Angeles, California, this 10 day of Sept., 1926.

CARL E. JOHNSON